July 13, 1965  M. W. WILSON  3,194,065
DIGITAL VERNIER TORQUEMETER
Filed April 4, 1961  3 Sheets-Sheet 1

INVENTOR
MEREDITH W. WILSON
BY
AGENT.

AMPLIFIER

PULSE SHAPER

July 13, 1965     M. W. WILSON     3,194,065

DIGITAL VERNIER TORQUEMETER

Filed April 4, 1961     3 Sheets-Sheet 3

AND GATE

GATE

FLIP FLOP

INVENTOR

MEREDITH W. WILSON

BY

AGENT

United States Patent Office 3,194,065
Patented July 13, 1965

3,194,065
DIGITAL VERNIER TORQUEMETER
Meredith W. Wilson, Washington, D.C., assignor to the United States of America as represented by the Secretary of the Navy
Filed Apr. 4, 1961, Ser. No. 100,766
19 Claims. (Cl. 73—136)
(Granted under Title 35, U.S. Code (1952), sec. 266)

The invention described herein may be manufactured and used by or for the Government of the United States of America for governmental purposes without the payment of any royalties thereon or therefor.

The present invention relates to torquemeters which employ electrical means for obtaining signals that sense an effect of a torque on a shaft, and for converting the signals into a utilizable indication of the torque.

Many mechanical, electrical, and optical systems exist in the prior art for measuring the torque in a shaft. Most of the commercially-available prior art devices have one or more undesirable features such as being cumbersome, inaccurate, or unsuitable when torsional vibrations exist in a shaft, requiring a special shaft section or slip rings, or being seriously affected by temperature changes.

The general purpose of this invention is to provide a torquemeter which embraces all of the advantages of similarly employed devices and overcomes the aforedescribed disadvantages. To attain this, the present invention utilizes a "digital vernier" principle of sensing and measuring shaft torque; a vernier system sensing the torque, and an electronic system converting the sensing signals into an output reading or measurement of the torque in digital form.

An object of the invention is to provide a torquemeter where the torque sensing is done by electric pulses that are completely processed electrically to present an indication of the torque in digital form.

Still another object of the invention is to provide an electric system for measuring shaft-torques, that is not affected by changes in the amplitude of the input signals fed thereto from the shaft, by changes in amplifier gain therein, or by other error-introducing factors such as changes in circuit component values.

In accordance with a preferred form of the invention, a pair of pulse producing means comprising pulse generators are fastened to a shaft at axially spaced locations. Each pulse producing means provides a fixed number of equally spaced pulses during each rotation of the shaft, but the number of pulses from one means differs from the number of pulses from the other means per shaft rotation. Preferably the pulse providing means comprise devices in the form of gears or toothed wheels associated with stationary magnetic pickups in which a pulse is produced as each tooth passes. As the shaft rotates, the torque transmitted by it causes the shaft to twist by an amount between the gears that is a function of the magnitude of the torque; and the teeth of the gears correspondingly shift relative to each other, resulting in a vernier action. This vernier action produces a point of coincidence of a pair of teeth which is monitored by electronic logical circuits. In the preferred embodiment, the point of coincidence is ascertained from the pulses produced or generated by the coincident teeth. By counting or timing the pulses from a reference point on the shaft to the point of coincidence, information about the magnitude of the torque can be obtained. The invention also provides electronic means for the treatment of the information to provide ready and meaningful visible indications.

Other objects and many of the attendants advantages of this invention will be readily appreciated as the same become better understood by reference to the following detailed description when considered in connection with the accompanying drawings. In the drawings, the input and output conductors of the various components are marked with the letters I or O, respectively. In the drawings.

In its preferred form, the instant invention utilizes what may be called a "digital vernier" principle. Two toothed wheels or spur gears are secured, as by clamping, in a preset angular relationship to a shaft whose torque it is desired to ascertain. The wheels are axially spaced apart a predetermined distance, and when the shaft twists under an applied torque, the wheels are displaced angularly with respect to each other. To measure this angular displacement, a pickup coil is mounted next to each wheel. Each pickup, with an associate amplifier, produces a pulse as each tooth of the associated wheel passes the pickup. Each of two wheels have teeth of the same shape which are equally spaced circumferentially thereon, but the wheels have slightly different numbers of teeth. As a result, under different angular twisting of the shaft the point of coincidence of two teeth, and hence of pulses, moves around the shaft producing a vernier action. The particular point of coincidence depends on the magnitude of the torque, other parameters of the shaft-rotation being unchanged.

A reference point is provided with respect to the shaft, preferably in association with one of the wheels by providing that wheel with a separate projection and pickup, or the equivalent, which will generate a single reference pulse once during every rotation of the shaft. The angular distance between this reference point and the point of coincidence of the two teeth of the two wheels is a direct measure of the shaft torque. In accordance with the invention, this angular distance is electronically ascertained by a measurement that starts with the reference pulse and is terminated by the simultaneous pulses that are generated only by the two teeth in coincidence.

A feature of the invention resides in the electronic treatment of the pulses generated in the pickups so that the torque readings are basically unaffected by normal variations in amplification factors, changes in temperature, shaft vibrations, etc. To this end, the pulses of the various pickups are converted to pulses of constant width. This use of pulse permits the timing of the pulses of the wheels to be compared and their number counted, preferably through electronic circuits including flip flops and gate controls. This information is utilized for visible torque indications in digital form.

Figure 1:
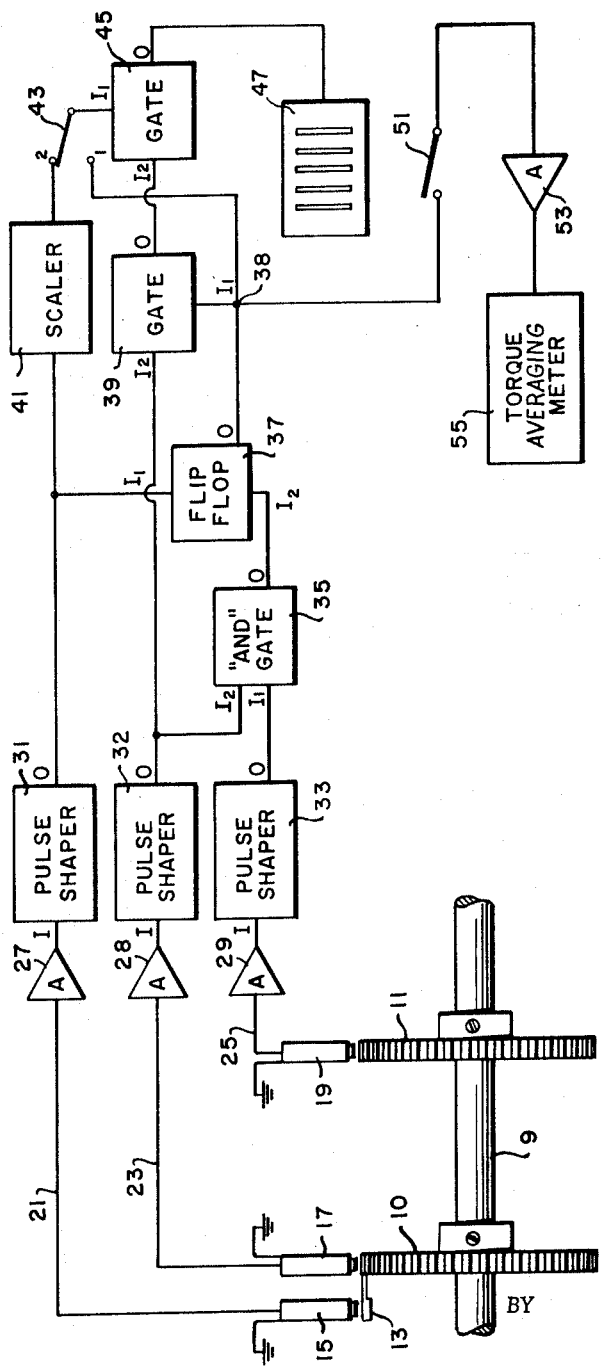
FIG. 1 is a schematic diagram in block form of the functional components of a preferred embodiment of the invention.

A preferred embodiment of the invention is shown schematically in FIG. 1 wherein the shaft 9 represents a shaft such as, for example, the propulsion shaft of a large ship, or test model. In order to measure the torque of the shaft, a pair of pulse producing means 10 and 11 which may be similar ferrous discs, gears or wheels, or the equivalent, are secured to the shaft at predetermined axially spaced points. Wheels are herein described which may be made in half-sections with hubs or flanges that permit the wheels to be clamped to the shaft. Each of the wheels is provided with a plurality of equally spaced teeth. The number of teeth on one wheel is, however, one more than the number on the second wheel. One of the wheels is also provided with a reference point from which pulses can be reckoned. In FIG. 1, a single reference point is used which is obtained from a ferrous tooth or position indicator 13 which extends axially outward in line with a tooth of wheel 10.

Initially, with no torque on the shaft 9, the indicator 13, a tooth on the wheel 10, and a tooth on the wheel 11 are accurately placed in axial alignment. In other words, they are in coincidence. At no other point will the wheels 10 and 11 have teeth in coincidence.

Associated with the wheels 10 and 11 are magnetic pickups 15, 17 and 19. The pickup 15 is radially outward from position indicator 13; and the pickup 17 is radially outward from the wheel 10. Consequently, as the wheel 10 rotates, pulses will be generated in the pickups 15 and 17 respectively by the indicator 13 and the teeth of wheel 10. Similarly, the pickup 19 is radially outward from the wheel 11, and will have pulses generated therein as the wheel 11 rotates. Vibration of shaft 9 will have no significant effect on these pulses. Position indicator 13 and pickup 15 also serve as a source of keying pulses.

The magnetic pickups 15, 17 and 19 may be of any well-known type such as is available commercially and the invention is not limited to the use of any particular type of magnetic pickup. A magnetic pickup that is known to be suitable for this use may be obtained from Electro Products Laboratories, Inc., 4501 Ravenswood, Chicago 40, Ill., and is described in their bulletin, Section 5500.

Figure 2:
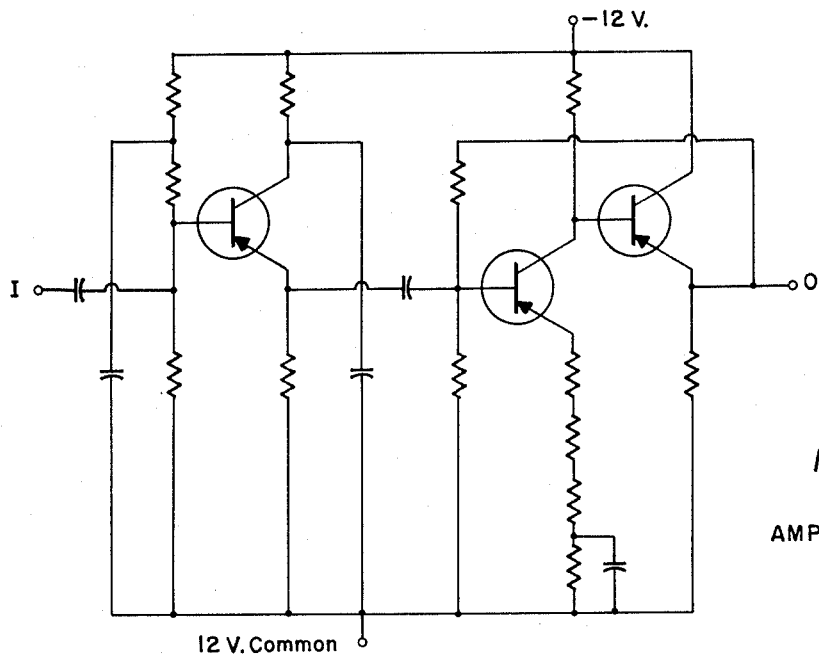
FIG. 2 is a schematic diagram of a suitable amplifier that may be used as a component of the invention.
Figure 3:
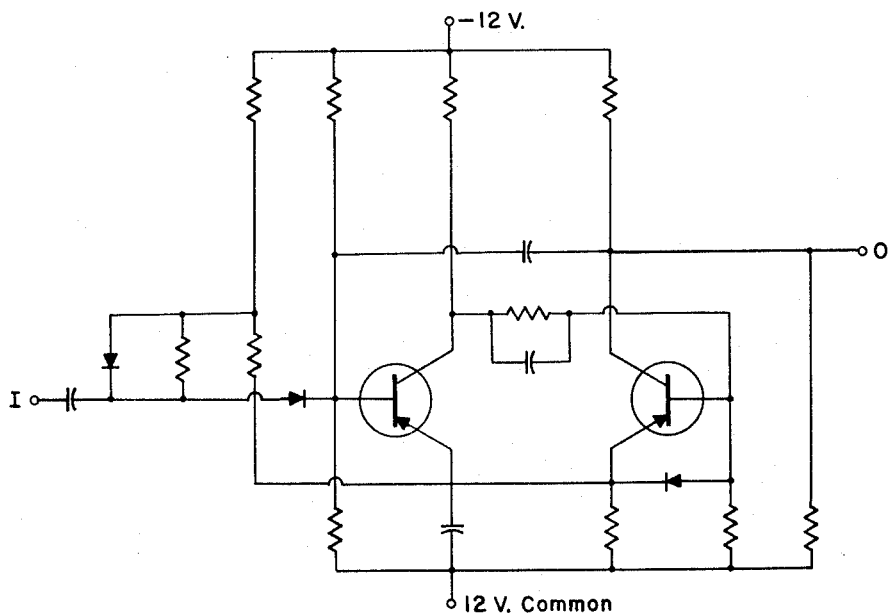
FIG. 3 is a schematic diagram of a suitable pulse shaper that may be used as a component of the invention.

The magnetic pickup 15 is connected to a pulse shaper 31 through an amplifier 27 and a circuit 21. Similarly magnetic pickup 17 is connected to pulse shaper 32 through an amplifier 28 by a circuit 23; and magnetic pickup 19 is connected to a pulse shaper 33 through an amplifier 29 and a circuit 25. In a particular embodiment a transistor amplifier was used for amplifiers 27, 28 and 29, which are all the same, the details of which are shown in FIG. 2. The transistor amplifier is a conventional amplifier with an emitter follower output. Pulse shapers 31, 32 and 33, which are all the same, are conventional transistorized monostable multivibrators, which produce a pulse of uniform height and width every time a positive pulse is placed at input I of a pulse shaper.

Figure 4:
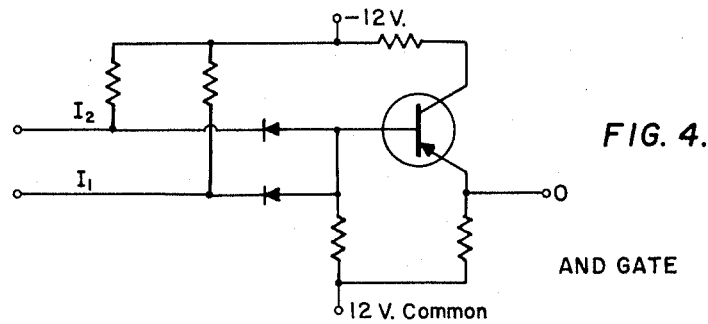
FIG. 4 is a schematic diagram of a suitable "And" gate which may be used as a component of the invention.
Figure 5:
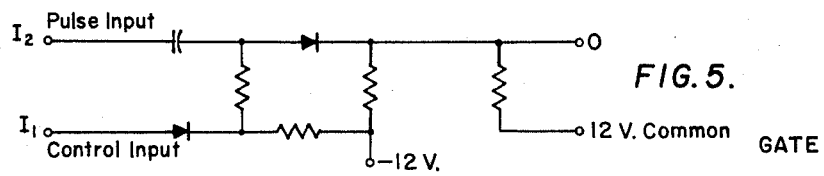
FIG. 5 is a schematic diagram of a suitable gate which may be used as a component of the invention.
Figure 6:
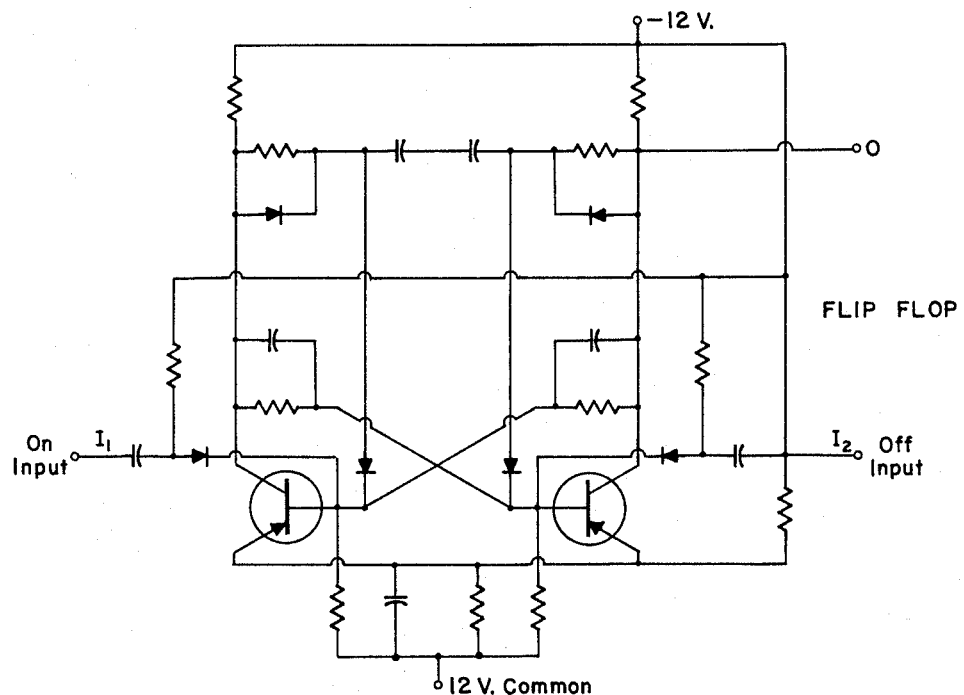
FIG. 6 is a schematic diagram of a suitable flip flop which may be used as a component of the invention.

The output of pulse shapers 32 and 33 are fed to an "and" gate 35, to control one of the inputs of a flip flop 37. In a particular embodiment, a transistor "and" gate of conventional connections was employed, the details of which are shown in FIG. 4. The other input of flip flop 37 is connected to the output of pulse shaper 31. In the particular embodiment a conventional transistorized bi-stable multivibrator is used for flip flop 37, the details of which are shown in FIG. 6. The multivibrator is triggered by applying pulses to the bases of the transistors. The instant invention by way of example utilizes a flip flop, but any bistable device may be utilized. The output of flip flop 37 is connected so as to control a gate 39 and optionally to an input of a gate 45, depending on the position of a manually-operated switch 43. Diode gates are used in a particular embodiment of the invention for gates 39 and 45 which are illustrated in FIG. 5. However, any type of control gate may be utilized. A control signal at terminal I, opens up the gate to pass signals placed at I₂ to the output O.

The output of pulse shaper 31 is also connected to the input of a scaler 41, and the output of the scaler, which is a square wave pulse, is connected to a terminal or switch 43. Scaler 41 may be of any well known type such as is illustrated in Brochure 11738 of the Walkirt Company, 141 W. Hazel Street, Inglewood 3, California, copyright 1958.

The output of gate 39 is connected in input I₂ of gate 45 and the second input of gate 45 is connected to the output of flip flop 37 when the switch 43 is in its No. 1 position. The output of gate 45 is connected to the input of a decade counter 47. Decade counter 47 may be of any well known type such as a Hewlett-Packard model 522B electronic counter described in the 522B Bulletin published June 1958 by Hewlett-Packard Company, 275 Page Mill Road, Palo Alto, California.

For an explanation of the operation of the system shown in FIG. 1, assume that the switch 43 is in its No. 1 position and switch 51 is open. The gates 39 and 45 are "off" or closed.

When torque is applied to shaft 9, say at its left in FIG. 1, the wheel 10 will advance in the direction of the torque with respect to wheel 11. The initial coincidence of teeth at indicator 13 is disturbed, and a new point of coincidence will occur, depending on the amount of shaft-twist between wheels 10 and 11, which twist, in turn, depends on the magnitude of the torque transmitted by the shaft. When the shaft 9 is rotating, each tooth of wheels 10 and 11 and also the position indicator 13 induces a pulse in its respective magnetic pickup 15, 17, or 19 as it passes under the pickup. The pulse which is induced in each magnetic pickup is fed to its associated amplifier 27, 28 or 29 where it is amplified. The amplified pulse is then fed to its associated pulse shaper 31, 32 or 33, which is a monostable multivibrator, and produces an output pulse of uniform width and height. The pickup 15 produces the reference keying pulse, and keys or initiates the measuring cycle, with each pulse. The pulses of pickup 15 operate pulse shaper 31 to trigger flip flop 37 to an "on" position in which position it opens the gates 39 and 45. This opening of the gates occurs as the shaft 9 reaches the reference point. From then on and with the gates 39 and 45 open, the pulses from the magnetic pickup 17, amplified by the amplifier 28 and shaped by the pulse shaper 32, are counted by the decade counter 47. The system is arranged to continue the counting until the point of coincidence between teeth on wheels 10 and 11 reaches the pickups 17 and 19; and at this time the pickups or the magnetic heads 17 and 19 produce simultaneous pulses which will arrive simultaneously at the input of "and" gate 35 and produce an output pulse to trigger flip flop 37 to its off condition. When this occurs, the off condition of flip flop 37 closes gate 39, and no more pulses are permitted to pass through to the counter 47 to be counted. Accordingly, the number of pulses counted by the counter 47 will be the pulse generated during the interval between the reference pulse produced by magnetic pickup 15 and the coincidence of the pulses of magnetic pickups 17 and 19. Since each pulse represents a tooth on the wheel, the ratio of the number of pulses counted divided by the number of teeth on the wheel 10 is proportional to the angular amount of twist in the shaft, and hence is proportional to the torque.

The same equipment may be utilized to provide an analog indication of the torque if desired. To this end switch 51 is connected to the control terminal 38 of the gate 39. A torque averaging meter 55 and an amplifier 53 is connected to the other side of switch 51. When the switch 51 is closed the voltage at point 38 is fed to the torque averaging meter 55. The "on" time of this voltage is equal to the time between the keying pulse and the coincidence pulse. Therefore, the percentage of "on" time versus "off" time of this voltage is equal to the percent of full-scale torque and the torque averaging meter 55 may be calibrated directly in units of torque.

For the purpose of sampling the torque, the switch 43 is placed in position number 2, so that gate 45 will be controlled by scaler 41 instead of flip flop 37. Scaler 41 produces a control signal on every tenth pulse so that a torque reading may be taken on every tenth cycle if desired. In addition scaler 41 records the number of cycles so that the readings may be totalized and divided by the number of cycles to give an average reading of the torque over a period of time. It has been found desirable to totalize the readings to obtain an average value of the torque when torsional oscillation or variations are present.

In the working model of the invention the wheels were made of ferrous metal five inches in diameter and mounted on a quarter-inch shaft. There was one keying pulse tooth. Wheel 10 had 100 teeth and wheel 11 had 99 teeth. The relationship between the keying pulse and teeth on the wheels can be expressed by the following formula. If there are $k$ keying pulses per tooth, then wheel 10 would have $kn$ teeth and wheel 11 would have $k(n-1)$ teeth where $k$ and $n$ are both integers. The circuits of FIGS. 2-6 are suitable examples of the component utilizable in the circuit of FIG. 1, but obviously many other forms of gates, flip flops are known to the art that can be used for the purpose.

Obviously many modifications and variations of the present invention are possible in the light of the above teachings. It is, therefore, to be understood that within the scope of the appended claims the invention may be practiced otherwise than as specifically described.

What is claimed is:

1. A meter for measuring the torque of a shaft which is extremely stable, comprising; a shaft, a first and second means spaced along said shaft and responsive to torsional displacement of the shaft for generating a pair of sets of signals in vernier relation during rotation of said shaft, said first signal containing a reference point in time indicating a first condition, said vernier relation being obtained by having a first time rate for the first signal and a different time rate for the second signal, means connected to said first and second generating means for determining a coincidence in the generated signals, means for indicating a first condition of said signals, means for receiving said sets of signals between a first condition of the signals and the point of coincidence of said signals for producing an output indicative of the torque on the shaft.

2. A meter for measuring the torque of a shaft which is extremely stable, comprising; a shaft, a first and second means at two axially spaced positions along said shaft operative during rotation of said shaft and responsive to torsional displacement of the shaft for generating a first and second set of successive pulses corresponding to different circumferential points of the shaft at said positions, said first means containing means for generating a reference point in time indicating a first condition, said first set of pulses containing a different number of pulses per revolution than said second set of pulses thereby establishing a vernier relation between said first and second set of pulses, means for indicating a first condition of both said first and said second set of pulses, means connected to said pulse generating means for determining a coincidence of pulses of said sets of pulses, means operative by a number of said pulses occurring between a reference point with respect to said shaft and the point of coincidence of pulses for producing an output indicative of the torque on the shaft.

3. A vernier torquemeter comprising; a shaft with a plurality of axially spaced apart pulse producing means mounted thereon, one of said pulse producing means being a keying means, electronic means coupled to the remaining pulse producing means for determining a coincidence of pulses, means coupled to said electronic means and to the pulse producing means responsive to the sequential time relationship between the keying pulse and the point of coincidence of pulses for producing an output which indicates the torque on the shaft.

4. A torquemeter as defined in claim 3 but further characterized by said pulse producing means comprising a magnetic wheel with teeth, a magnetic pickup, said magnetic wheel with teeth passing in inductive relationship by said magnetic pickup during rotation of the shaft.

5. A torquemeter as defined in claim 4 but further characterized by said means coupled to said electronic means and to the pulse producing means comprising a gate for passing signals, a flip flop connected to said gate for controlling said gate, and whereby the flip flop is turned on by the keying pulse and turned off by the electronic means.

6. A torquemeter as defined in claim 3 but further characterized by said means coupled to said electronic means and to the pulse producing means comprising a gate for passing signals, a flip flop connected to said gate controlling said gate, whereby the flip flop is turned on by the keying pulse and turned off by the coincidence indicating means.

7. A vernier torquemeter comprising; a shaft, a first means for generating a first set of pulses during rotation of the shaft, the first set of pulses corresponding to a first number of predetermined angular positions on the shaft, means for generating a keying pulse at a predetermined angular position of the shaft, second means for generating a second set of pulses during rotation of the shaft, the second set of pulses corresponding to a second number of predetermined angular positions on the shaft, the said first means being axially spaced along said shaft from the said second means, said numbers of positions having a vernier relation, and means responsive to a number of pulses generated by said first means between the keying pulse and the coincidence of said pulses produced by said first pulse generating means and said second pulse generation for providing a measure of the torque in the shaft.

8. A torquemeter as defined in claim 7 but further characterized by the last said means comprising a pulse counter.

9. A vernier torquemeter comprising, a shaft means for generating a keying pulse during each cycle of rotation of said shaft, a first means for generating pulses during each cycle of rotation of said shaft, a second means for generating pulses during each cycle of rotation of said shaft, said pulses having a vernier relation with respect to torsional displacement of said shaft, a flip flop having a pair of inputs and an output, one of said inputs being coupled to said keying pulse generator means, an "and" gate having a pair of inputs, one of said gate inputs being coupled to said first pulse generating means and the other one of said gate inputs being coupled to said second pulse generating means, the output of said "and" gate being coupled to the other input of said flip flop, a first gate having its control terminal connected to the output of said flip flop, said first gate having a second input coupled to said first pulse generating means, and means coupled to the output of said first gate, and responsive to pulses of one of said generating means for providing a measure of the torque in the shaft.

10. A torquemeter as defined in claim 9, but further characterized by said pulse generating means comprising pulse shapers.

11. A torquemeter as defined in claim 9, but further characterized by having each of said pulse generating means coupled in series with a respective amplifier.

12. A torquemeter as defined in claim 11, but further characterized by said torque-measuring means comprising a decade counter.

13. A torquemeter as defined in claim 12, but further characterized by having a scaler coupled to the keying pulse generator means for counting the number of keying pulses.

14. A torquemeter as defined in claim 9, but further characterized by having a scaler coupled to the keying pulse generator means for counting the number of keying pulses.

15. A torquemeter as defined in claim 9, but further characterized by said torque-measuring means comprising a decade counter.

16. A torquemeter as defined in claim 9, but further characterized by said torque-measuring means comprising an averaging meter.

17. An arrangement for measuring an angular displacement of a member, comprising, in combination, two systems for generating electric currents having frequencies, respectively, differing slightly from each other and being in phase with each other at one periodically recurring instant constituting a time reference point, each of said systems including a pulse creating means for creating pulses at the frequency of the respective system, and pick-up means cooperating with said respective pulse creating means; two rotatable co-axially arranged support elements, each carrying one of said means of one of said systems, respectively, the other means of the respective systems being arranged adjacent to said one means of the respective system for cooperation therewith so as to create during rotation of said support elements at equal speed said currents at slightly different frequencies; means for varying the phase-determining relationship between said systems by causing an angular displacement of one of said support elements relative to the other, resulting in a shift of the moment of phase equality between said currents of different frequencies; and means for determining the number of full cycles of one of said currents between said time reference point and said shifted moment of phase equality between said currents, said number of full cycles being an indication of the amount of said angular displacement of one of said support elements relative to the other one thereof.

18. In an apparatus for measuring angular deviations in a transverse plane of at least a portion of a rotatable member from a reference position determined by another portion thereof in combination, means mounted on a rotatable member for producing a first frequency signal upon rotation of said rotatable member at a predetermined speed, a second means for producing a second frequency signal upon rotation of said member at said predetermined speed, said second record frequency differing by at least one cycle from said first frequency, and means for producing a third signal upon rotation of said member at said speed, said third signal comprising at least one impulse per revolution, the start of said impulse coinciding with the start of one of the cycles of said first frequency signal; first, second and third pick-up means mounted respectively opposite said first, second and third signal producing means for being actuated thereby, drive means for rotating said rotatable member at a predetermined speed; means for causing, during rotation of said member, a time shift between said first and second signals proportional to an angular deviation of said first mentioned portion of said rotatable member from said reference position; phase comparator means in circuit with said first and second pick-up means, respectively, for comparing the respective phases of said first and second signals and for furnishing an impulse when the phase difference is zero; and counter means connected between said third pick-up means and said phase comparator means, said counter means being adapted to be started by said third signal so as to count the consecutive cycles of said first signal and being adapted to be stopped by said impulse from said phase comparator means, whereby the number of counted cycles indicates the amount of angular deviation of said rotatable member from a reference position during its rotation.

19. In an apparatus for measuring angular deviations in a transverse plane of a rotatable member from a reference position comprising a first means mounted on a rotatable member for producing a first frequency signal upon rotation of said rotatable member at a predetermined speed, a second means mounted on said rotatable member a predetermined distance from said first means for producing a second frequency signal upon rotation of said rotatable member at said predetermined speed, said second frequency differing by at least one cycle from said first frequency and a third means for producing a third signal upon rotation of said member at said speed, said third signal comprising at least one impulse per revolution, the start of said impulse coinciding with the start of one of the cycles of said first signal; first, second and third pick-up means mounted stationarily opposite said first, second and third signal producing means respectively, for being actuated thereby; phase detector means in circuit with said first and second pick-up means, respectively, for comparing the respective phases of said first and second signals and for furnishing an impulse when the phase difference is zero; gate means in circuit with said first pick-up means for delivering at its output pulses furnished by said first signal, and in circuit with said third pick-up means and with said phase detector means for being opened by said third signal for passing said pulses from said first pick-up means, and for being closed by said impulse from said phase detector means, whereby the number of pulses from said first pick-up means appearing within a time unit at the output of said gate means is indicative of the degree of angular displacement of said rotatable member.

References Cited by the Examiner

UNITED STATES PATENTS

| | | | |
|---|---|---|---|
| 2,621,514 | 12/52 | Waugh | 73—136 |
| 2,675,700 | 4/54 | Vandergrift | 73—136 |
| 2,947,168 | 8/60 | Yang | 73—136 |
| 3,049,003 | 8/62 | Felder | 73—136 |

FOREIGN PATENTS 136,775  7/60  U.S.S.R.

RICHARD C. QUEISSER, Primary Examiner.

ROBERT L. EVANS, Examiner.